United States Patent
Balash

(10) Patent No.: US 9,777,821 B2
(45) Date of Patent: Oct. 3, 2017

(54) SPROCKET ASSEMBLY AND A METHOD FOR INSTALLING A REMOVABLE TOOTH ON A SPROCKET FRAME

(71) Applicant: Vaughan Industries Inc., Detroit, MI (US)

(72) Inventor: Andrew Vaughan Balash, Saint Clair Shores, MI (US)

(73) Assignee: Vaughan Industries Inc., Detroit, MI (US)

( * ) Notice: Subject to any disclaimer, the term of this patent is extended or adjusted under 35 U.S.C. 154(b) by 0 days.

(21) Appl. No.: 14/938,984

(22) Filed: Nov. 12, 2015

(65) Prior Publication Data

US 2016/0061310 A1    Mar. 3, 2016

Related U.S. Application Data

(62) Division of application No. 13/622,428, filed on Sep. 19, 2012, now Pat. No. 9,194,476.

(51) Int. Cl.
*F16H 55/30* (2006.01)
*F16H 55/12* (2006.01)

(52) U.S. Cl.
CPC ........... *F16H 55/303* (2013.01); *F16H 55/12* (2013.01); *Y10T 29/49462* (2015.01)

(58) Field of Classification Search
USPC ....................................................... 474/162
See application file for complete search history.

(56) References Cited

U.S. PATENT DOCUMENTS

| 243,738 | A | * | 7/1881 | Stutz | F16H 55/30 474/162 |
|---|---|---|---|---|---|
| 277,774 | A | * | 5/1883 | Okell | 198/712 |
| 358,771 | A | * | 3/1887 | Dodge | F16H 55/30 474/162 |
| 405,607 | A | * | 6/1889 | Selleck | F16H 55/30 474/162 |
| 457,420 | A | * | 8/1891 | Neacy | F16H 55/30 474/162 |
| 708,232 | A | * | 9/1902 | Jackling | F16H 55/54 474/162 |
| 736,904 | A | * | 8/1903 | Willson, Jr. | F16G 13/06 474/162 |
| 969,237 | A | * | 9/1910 | Woolnough | F16H 55/12 474/162 |

(Continued)

*Primary Examiner* — William E Dondero
*Assistant Examiner* — Mark K Buse
(74) *Attorney, Agent, or Firm* — Buckert Patent & Trademark Law Firm PC; John F. Buckert

(57) ABSTRACT

A sprocket assembly is provided. The assembly includes a sprocket frame having a central body and a first ledge portion body. The first ledge portion has a first aperture extending therethrough. The assembly further includes a first removable tooth having a first tip portion, first and second landing portions, and a first extension portion. The first tip portion has first and second sides and first and second ends. The first extension portion extends from the second end and has an aperture extending therethrough. The assembly further includes a first bolt extending through the first aperture in the first ledge portion and the aperture in the first extension portion to removably couple the first extension portion to the first ledge portion.

10 Claims, 20 Drawing Sheets

(56) References Cited

U.S. PATENT DOCUMENTS

| | | | | | |
|---|---|---|---|---|---|
| 1,530,403 | A | * | 3/1925 | Parsons | F16H 55/303 474/162 |
| 1,630,313 | A | * | 5/1927 | Rorabeck | F16H 55/30 474/162 |
| 3,381,354 | A | * | 5/1968 | Krempa | B23F 15/00 29/525.02 |
| 3,439,551 | A | * | 4/1969 | Militana | F16H 55/12 474/162 |
| 4,058,023 | A | * | 11/1977 | Smith | B65G 23/06 403/337 |
| 5,380,254 | A | * | 1/1995 | Maguire | B62D 55/135 474/152 |
| 6,336,882 | B1 | * | 1/2002 | Ullein | F01L 1/02 474/161 |
| 7,967,709 | B2 | * | 6/2011 | Emura | B62M 9/105 474/160 |

* cited by examiner

SPROCKET ASSEMBLY AND A METHOD FOR INSTALLING A REMOVABLE TOOTH ON A SPROCKET FRAME

CROSS-REFERENCE TO RELATED APPLICATIONS

This application is a divisional application of U.S. patent application Ser. No. 13/622,428 filed on Sep. 19, 2012, the entire contents of which are hereby incorporated by reference herein.

BACKGROUND

The inventor herein has recognized a need for an improved sprocket assembly and a method for installing a removable tooth on the sprocket frame.

SUMMARY

A sprocket assembly in accordance with an exemplary embodiment is provided. The sprocket assembly includes a sprocket frame having a central body and at least first, second, third, and fourth ledge portions extending from the central body. The first, second, third, and fourth ledge portions have at least first, second, third, and fourth apertures, respectively, extending therethrough. The sprocket assembly further includes a first removable tooth having a first tip portion, first and second landing portions, and a first extension portion. The first tip portion of the first removable tooth has first and second sides and first and second ends. The first landing portion extends from the first side generally perpendicular to the first side and is disposed proximate to the second end. The second landing portion of the first removable tooth extends from the second side generally perpendicular to the second side and is disposed proximate to the second end. The first extension portion of the first removable tooth extends from the second end and has an aperture extending therethrough. The sprocket assembly further includes a first bolt configured to extend through the first aperture in the first ledge portion of the sprocket frame and the aperture in the first extension portion of the first removable tooth to removably couple the first extension portion to the first ledge portion.

A method for installing a removable tooth on a sprocket frame in accordance with another exemplary embodiment is provided. The method includes providing the sprocket frame having a central body and at least first, second, third, and fourth ledge portions extending from the central body. The first, second, third, and fourth ledge portions have at least first, second, third, and fourth apertures, respectively, extending therethrough. The method further includes providing a first removable tooth having a first tip portion, first and second landing portions, and a first extension portion. The first tip portion of the first removable tooth has first and second sides and first and second ends. The first landing portion extends from the first side generally perpendicular to the first side and is disposed proximate to the second end. The second landing portion of the first removable tooth extends from the second side generally perpendicular to the second side and is disposed proximate to the second end. The first extension portion of the first removable tooth extends from the second end and has an aperture extending therethrough. The method further includes disposing the first extension portion of the first removable tooth on the first ledge portion of the sprocket frame. The method further includes disposing a first bolt through the aperture in the first extension portion of the first removable tooth and the first aperture in the first ledge portion of the sprocket frame. The method further includes coupling a first nut onto a threaded portion of the first bolt to removably couple the first extension portion to the first ledge portion.

A sprocket assembly in accordance with another exemplary embodiment is provided. The sprocket assembly includes a plastic sprocket frame having a central body and at least first, second, third, and fourth ledge portions extending from the central body. The first, second, third, and fourth ledge portions have at least first, second, third, and fourth apertures, respectively, extending therethrough. The sprocket assembly further includes a first removable plastic tooth having a first tip portion and a first extension portion. The first tip portion of the first removable plastic tooth has first and second sides and first and second ends. The first extension portion of the first removable plastic tooth extends from the second end and has an aperture extending therethrough. The sprocket assembly further includes a first bolt configured to extend through the first aperture in the first ledge portion of the plastic sprocket frame and the aperture in the first extension portion of the first removable plastic tooth to removably couple the first extension portion to the first ledge portion.

A method for installing a removable plastic tooth on a plastic sprocket frame in accordance with another exemplary embodiment is provided. The method includes providing the plastic sprocket frame having a central body and at least first, second, third, and fourth ledge portions extending from the central body. The first, second, third, and fourth ledge portions have at least first, second, third, and fourth apertures, respectively, extending therethrough. The method further includes providing a first removable plastic tooth having a first tip portion and a first extension portion. The first tip portion of the first removable plastic tooth has first and second sides and first and second ends. The first extension portion of the first removable plastic tooth extends from the second end and has an aperture extending therethrough. The method further includes disposing the first extension portion of the first removable plastic tooth on the first ledge portion of the plastic sprocket frame. The method further includes disposing a first bolt through the aperture in the first extension portion of the first removable plastic tooth and the first aperture in the first ledge portion of the plastic sprocket frame. The method further includes coupling a first nut onto a threaded portion of the first bolt to removably couple the first extension portion to the first ledge portion.

DETAILED DESCRIPTION

Figure 1:
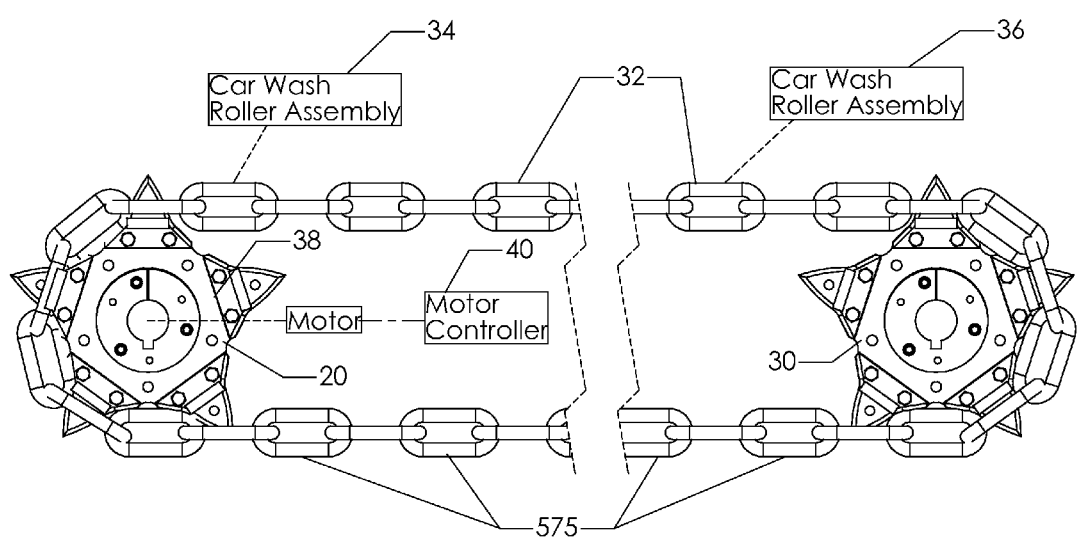
FIG. 1 is a schematic of a car wash conveyor system in accordance with an exemplary embodiment.

Referring to FIGS. 1-6, a car wash conveyor system 10 in accordance with an exemplary embodiment is provided. The car wash conveyor system 10 includes a sprocket assembly 20, a sprocket assembly 30, a chain 32, a car wash roller assembly 34, a car wash roller assembly 36, a motor 38, and a motor controller 40. An advantage of the sprocket assembly 20 is that the sprocket assembly 20 utilizes removable teeth that are configured to be readily replaced when the removable teeth become degraded.

The motor 38 has a shaft (not shown) that rotates the sprocket assembly 20 in response to receiving control signals from the motor controller 40. When the sprocket assembly 20 rotates in a first rotational direction, removable teeth in the sprocket assembly 20 engage chain links in the chain 32 to move the chain 32 in a predetermined direction. In response to the movement of the chain 32 in the predetermined direction, car wash roller assemblies 34, 36 that are coupled to the chain 32 move along with the chain 32. Further, the sprocket assembly 30 engages chain links in the chain 32 and rotates in the first rotational direction in response to the movement of the chain 32. In one exemplary embodiment, the car wash roller assemblies 34, 36 can comprise at least one of the car wash roller assemblies described in U.S. Pat. No. 8,161,888 or U.S. patent application Ser. No. 13/100,607, which are both incorporated by reference herein in their entirety.

Referring to FIGS. 2-6, the sprocket assemblies 20, 30 have an identical structure to one another. Accordingly, only the structure of the sprocket assembly 20 will be described in greater detail below. The sprocket assembly 20 includes a sprocket frame 60, a removable tooth 70, a removable tooth 80, a removable tooth 90, a removable tooth 100, a removable tooth 110, bolts 170, 172, 180, 182, 190, 192, 200, 202, 210, 212, nuts 270, 272, 280, 282, 290, 292, 300, 302, 310, 312, an insert bushing 350, and bolts 352, 354, 356.

The sprocket frame 60 is configured to be coupled to a rotatable shaft of the motor 38 and is further configured to hold the removable teeth 70, 80, 90, 100, 110 thereon. The sprocket frame 60 includes the central body 360, and ledge portions 370, 380, 390, 400, 410 that extend outwardly from an outer periphery of the central body 360. In one exemplary embodiment, the sprocket frame 60 is constructed of steel. Of course, in alternative embodiments, other materials known to those skilled in the art could be utilized to construct the sprocket frame 60.

The central body 360 includes a central aperture 361 extending therethrough that is configured to receive the insert bushing 350 therein. The thickness of the central body 360 is greater than a thickness of each of the ledge portions 370-410. In one exemplary embodiment, the central body 360 has a generally pentagonal shape.

The ledge portion 370 is configured to hold an extension portion of the removable tooth 70 thereon and includes apertures 470, 472 extending therethrough.

The ledge portion 380 is configured to hold an extension portion of the removable tooth 80 thereon and includes apertures 480, 482 extending therethrough.

The ledge portion 390 is configured to hold an extension portion of the removable tooth 90 thereon and includes apertures 490, 492 extending therethrough.

The ledge portion 400 is configured to hold an extension portion of the removable tooth 100 thereon and includes apertures 500, 502 extending therethrough.

The ledge portion 410 is configured to hold an extension portion of the removable tooth 110 thereon and includes apertures 510, 512 extending therethrough.

The removable teeth 70, 80, 90, 100, 110 are configured to be removably coupled to the ledge portions 370, 380, 390, 400, 410, respectively. The structure of the removable teeth 70, 80, 90, 100, 110 are identical to one another. Accordingly, for purposes of simplicity only the structure of the removable tooth 70 will be described in greater detail below.

Referring to FIGS. 7-11, the removable tooth 70 includes a tip portion 550, landing portions 562, 564, and an extension portion 566. The tip portion 550 has first and second sides 552, 554 and first and second ends 556, 558. The landing portion 562 extends from the first side 552 generally perpendicular to the first side 552 and is disposed proximate to the second end 558. The landing portion 564 extends from the second side 554 generally perpendicular to the second side 554 and is disposed proximate to the second end 558. The extension portion 566 extends from the second end 558 and has apertures 570, 572 extending therethrough.

Figure 8:
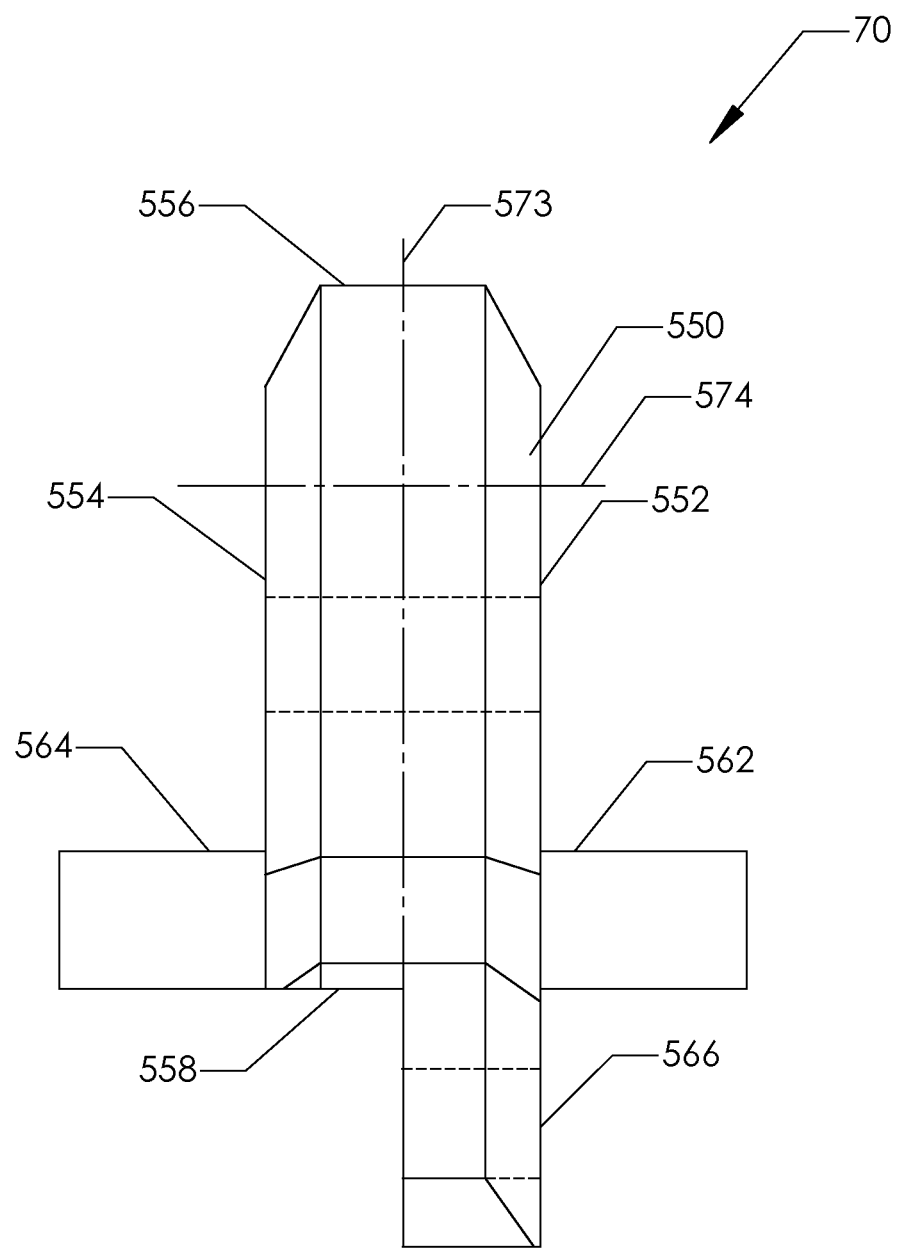
FIG. 8 is a schematic having a side view of the removable tooth of FIG. 7.
Figure 9:
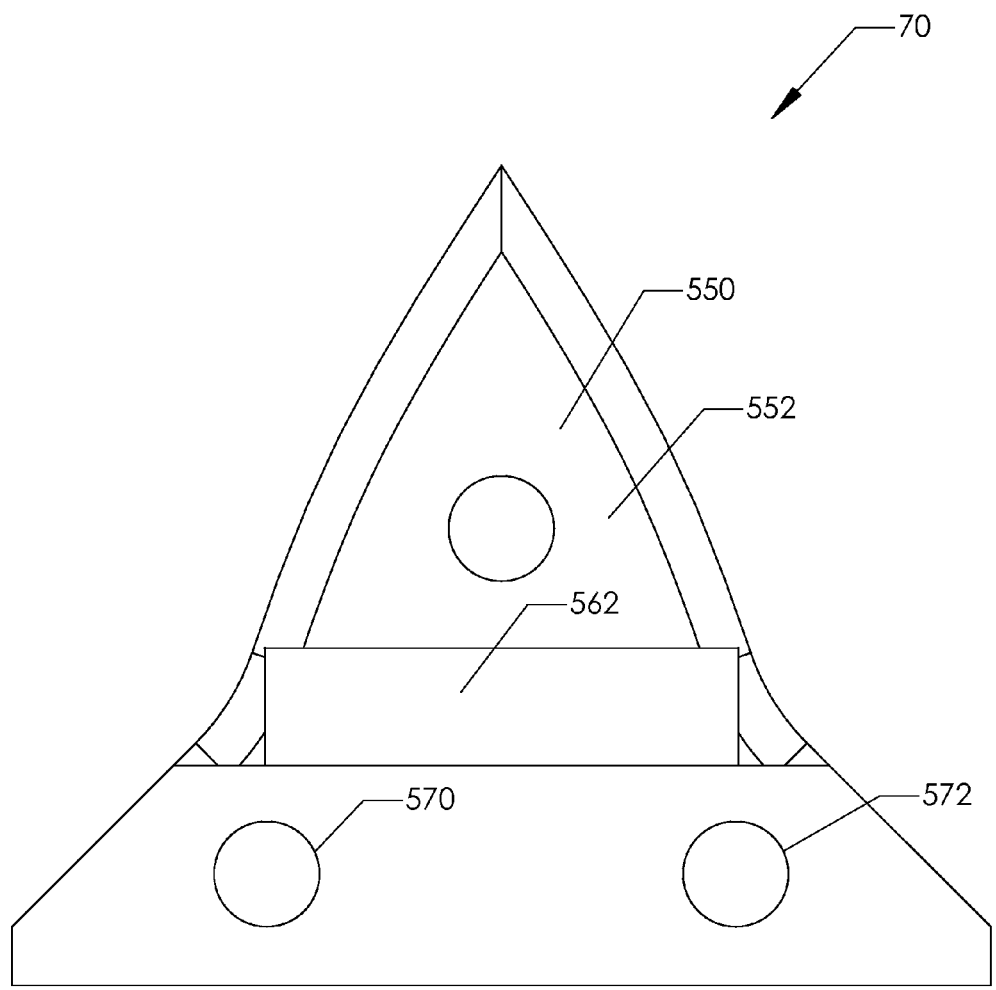
FIG. 9 is a schematic having a front view of the removable tooth of FIG. 7.
Figure 10:
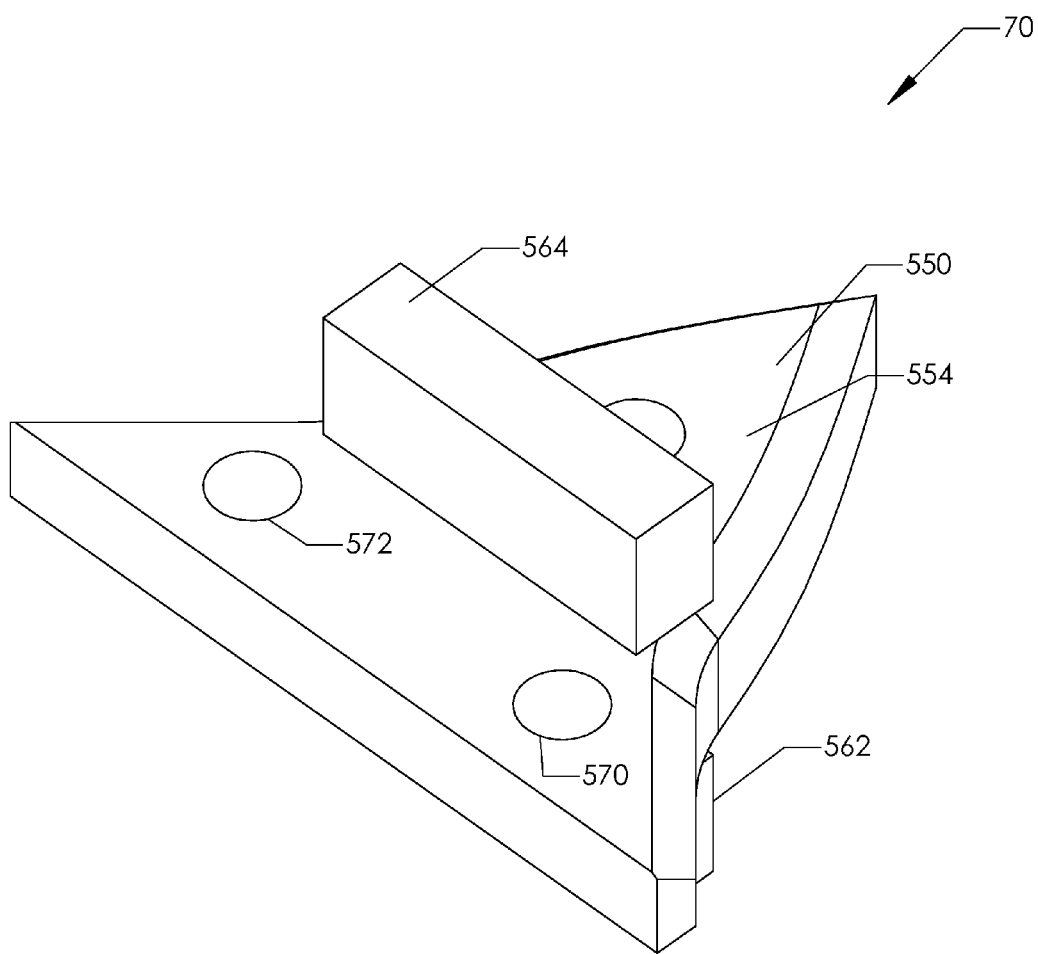
FIG. 10 is a schematic having another isometric view of the removable tooth of FIG. 7.
Figure 11:
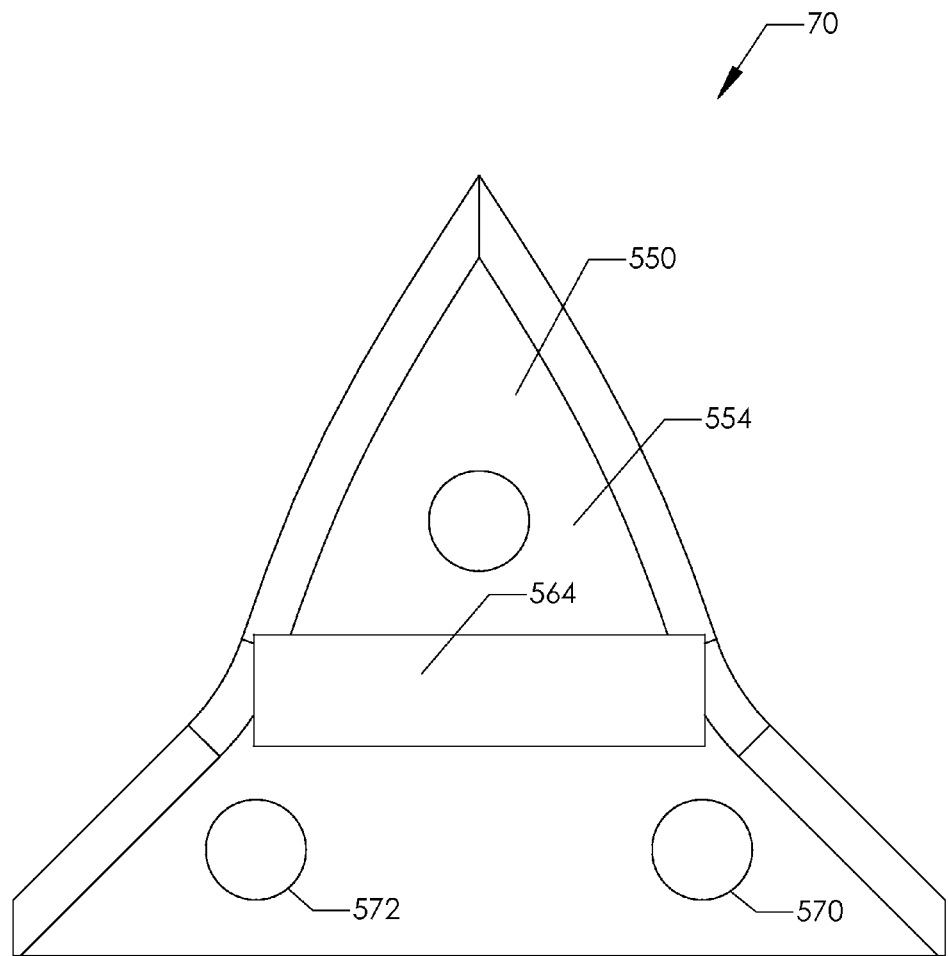
FIG. 11 is a schematic having a rear view of the removable tooth of FIG. 7.

Referring to FIG. 8, the tip portion 550 and the landing portions 562, 564 are configured to operably engage chain links thereon. A longitudinal axis 573 extends from the first end 556 to the second end 558 of the tip portion 550. The extension portion 556 extends from the second end 558 parallel to the longitudinal axis 573. An axis 574 extends between the first and second sides 552, 554 of the tip portion 550 generally perpendicular to the first and second sides 552, 554. A thickness of the tip portion 550 is substantially equal to a combined thickness of both the extension portion 566 and the ledge portion 370 in a direction parallel to the axis 574.

Figure 2:
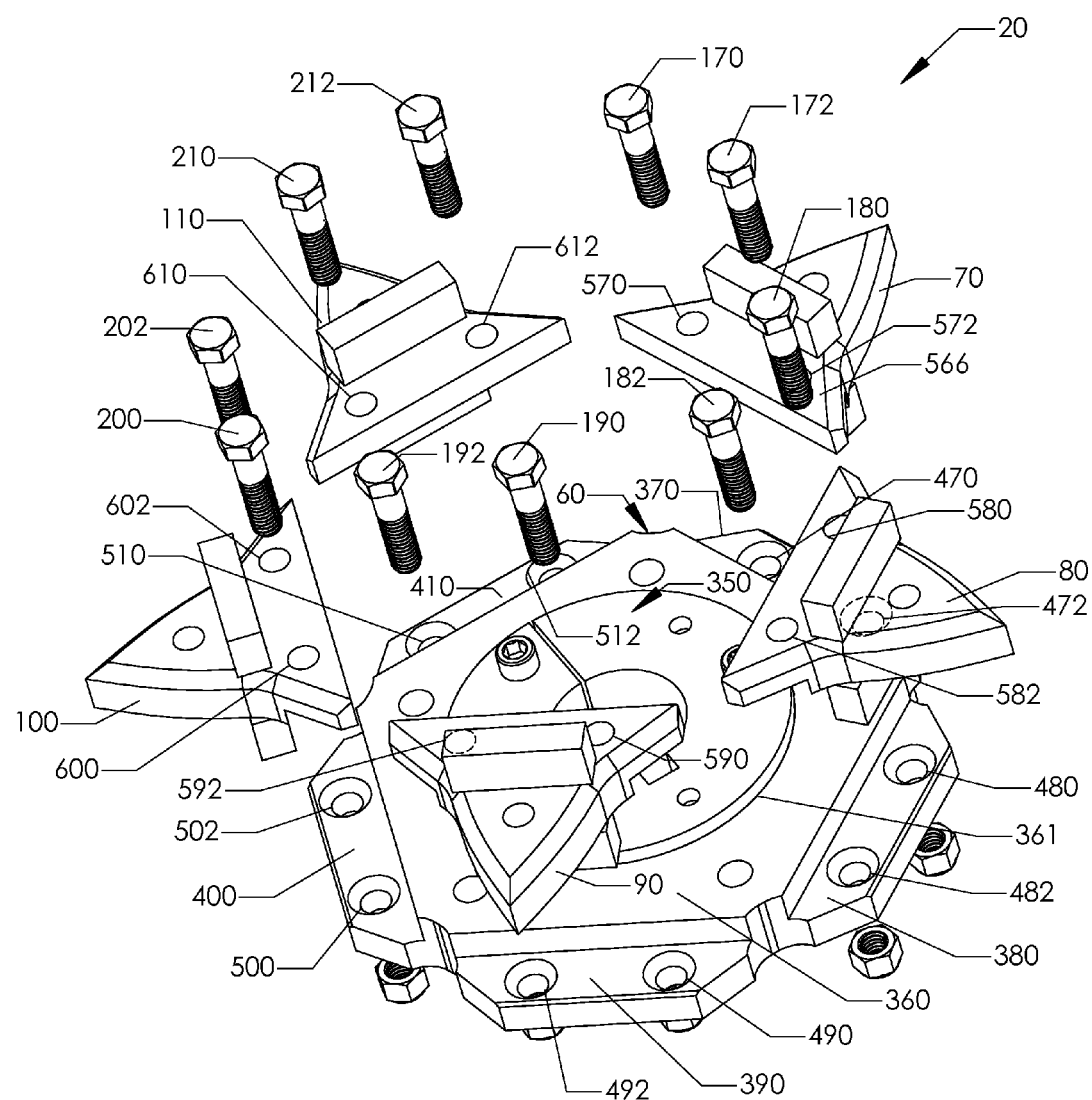
FIG. 2 is an exploded schematic of a sprocket assembly utilized in the car wash conveyor system of FIG. 1.
Figure 3:
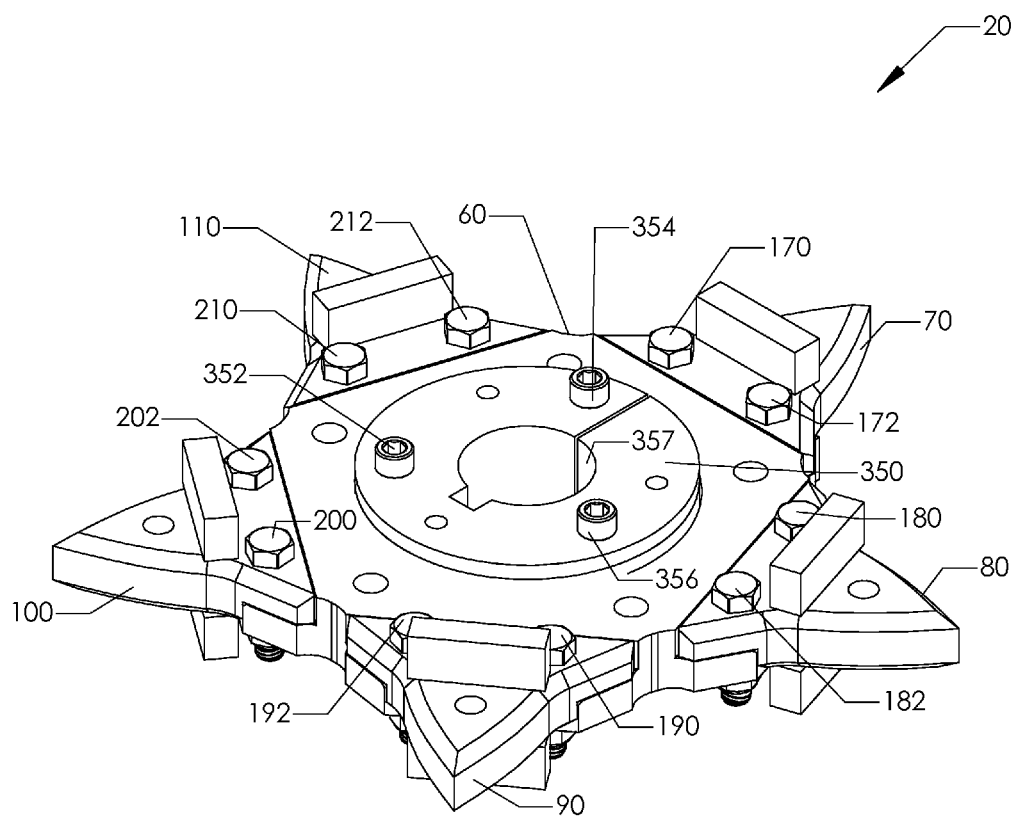
FIG. 3 is a schematic having an isometric view of the sprocket assembly of FIG. 2.
Figure 4:
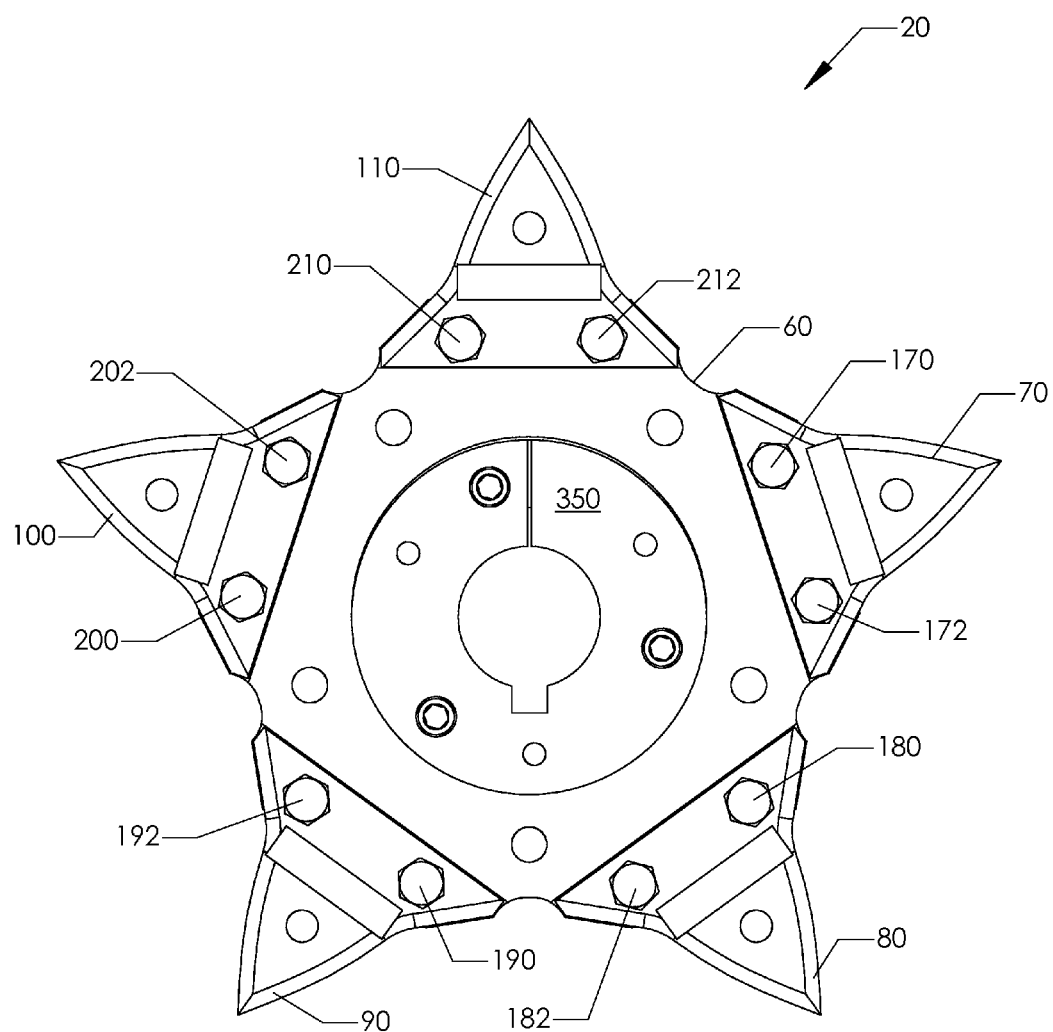
FIG. 4 is a schematic having a front view of the sprocket assembly of FIG. 2.
Figure 5:
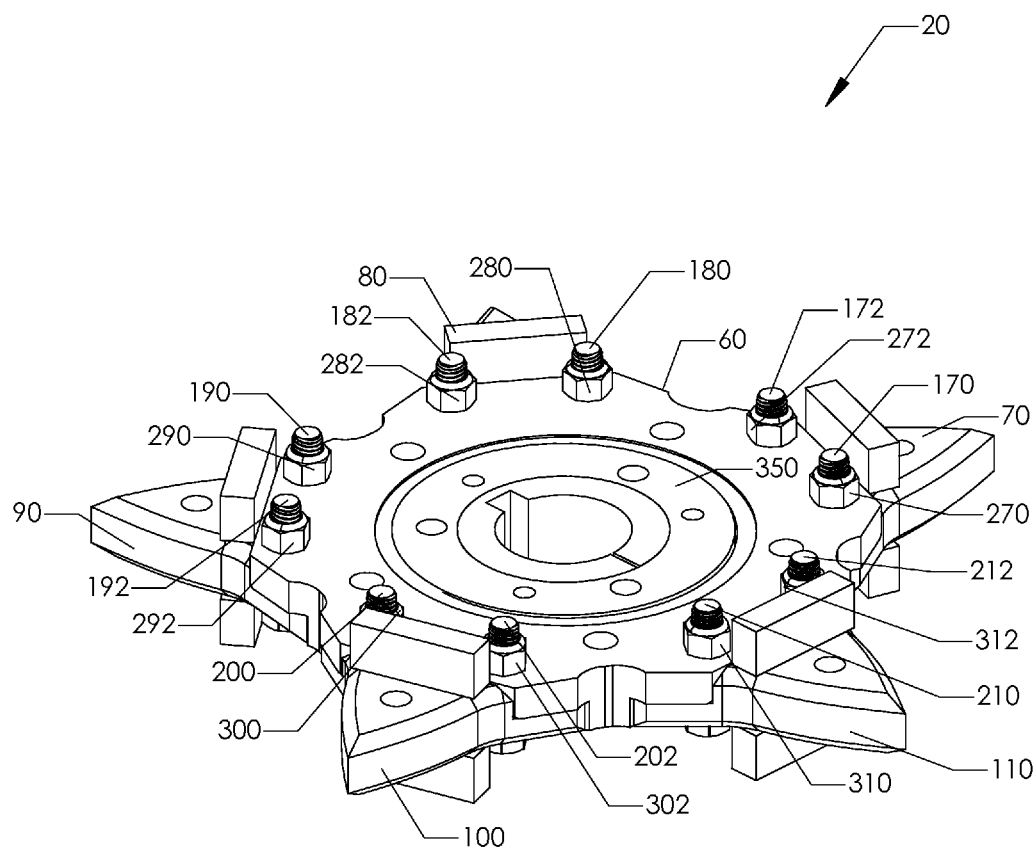
FIG. 5 is a schematic having another isometric view of the sprocket assembly of FIG. 2.
Figure 6:
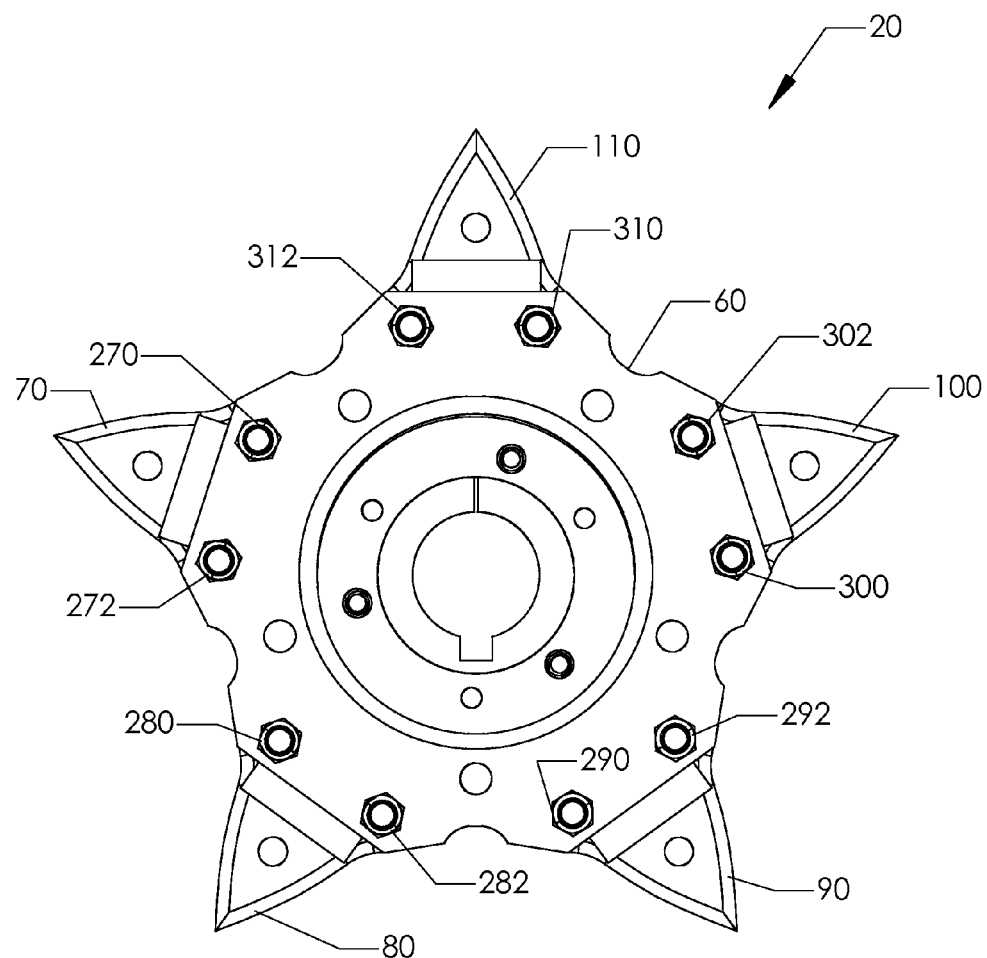
FIG. 6 is a schematic having a rear view of the sprocket assembly of FIG. 2.
Figure 7:
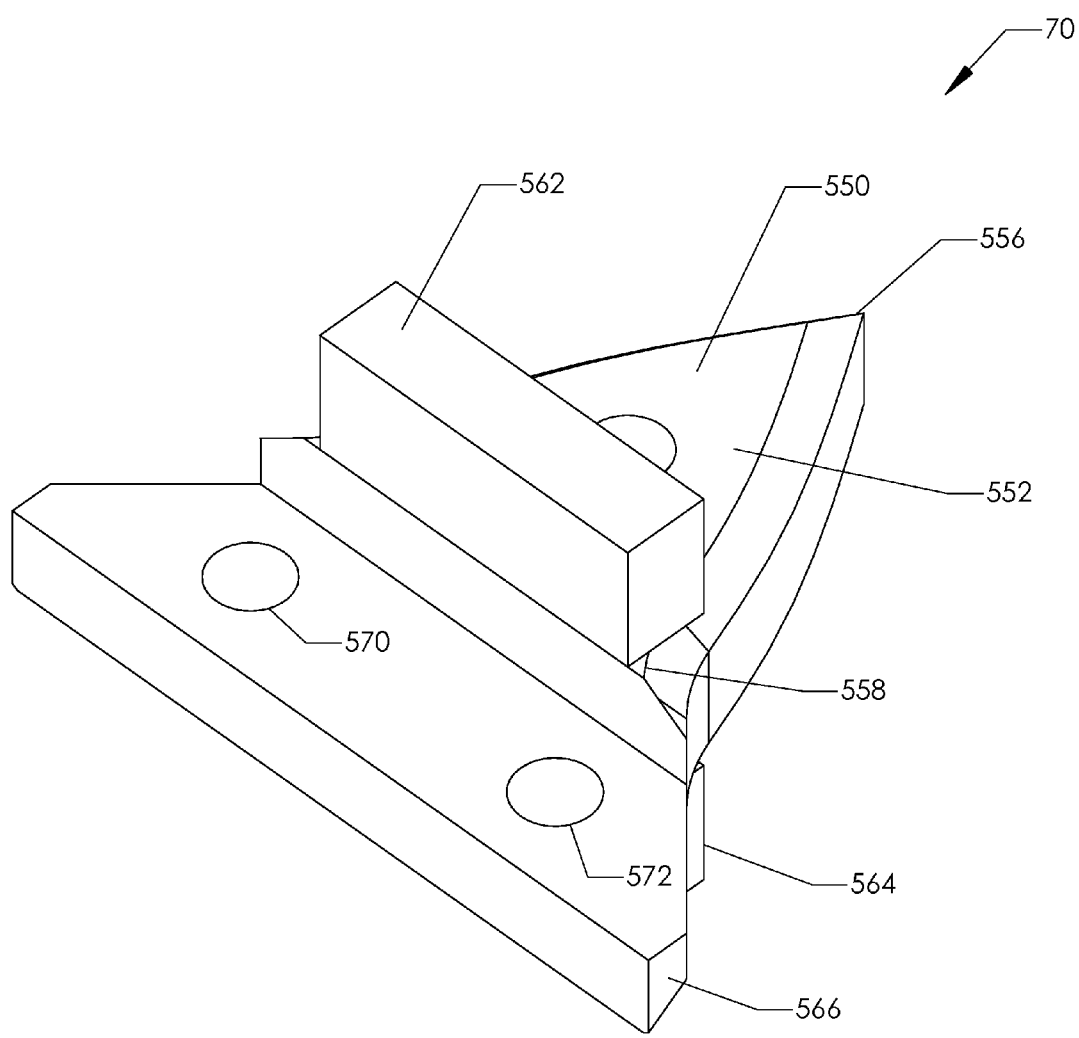
FIG. 7 is a schematic having an isometric view of a removable tooth utilized in the sprocket assembly of FIG. 2.

Referring to FIGS. 2 and 5, the bolts 170, 172 are configured to extend through the apertures 570, 572, respectively, in the extension portion 566 of the removable tooth 70, and through the apertures 470, 472, respectively, in the ledge portion 370. The bolts 170, 172 have corresponding threads that are threadably received in the nuts 270, 272, respectively, to removably couple the extension portion 566 to the ledge portion 370.

The bolts 180, 182 are configured to extend through the apertures 580, 582, respectively, in the extension portion of the removable tooth 80, and through the apertures 480, 482, respectively, in the ledge portion 380. The bolts 180, 182 have corresponding threads that are threadably received in the nuts 280, 282, respectively, to removably couple the extension portion of the removable tooth 80 to the ledge portion 380.

The bolts 190, 192 are configured to extend through the apertures 590, 592, respectively, in the extension portion of the removable tooth 90, and through the apertures 490, 492, respectively, in the ledge portion 390. The bolts 190, 192 have corresponding threads that are threadably received in the nuts 290, 292, respectively, to removably couple the extension portion of the removable tooth 90 to the ledge portion 390.

The bolts 200, 202 are configured to extend through the apertures 600, 602, respectively, in the extension portion of the removable tooth 100, and through the apertures 500, 502, respectively, in the ledge portion 400. The bolts 200, 202 have corresponding threads that are threadably received in the nuts 300, 302, respectively, to removably couple the extension portion of the removable tooth 100 to the ledge portion 400.

The bolts 210, 212 are configured to extend through the apertures 610, 612, respectively, in the extension portion of the removable tooth 110, and through the apertures 510, 512, respectively, in the ledge portion 410. The bolts 210, 212 have corresponding threads that are threadably received in the nuts 310, 312, respectively, to removably couple the extension portion of the removable tooth 110 to the ledge portion 410.

The insert bushing 350 is configured to be received within the central aperture 361 of the sprocket frame 60. In one exemplary embodiment, the insert bushing 350 is substantially split-ring-shaped and has an internal aperture 357 extending therethrough. In one exemplary environment, the insert bushing 350 is constructed of steel. The insert bushing 350 is fixedly coupled to the central body 360 of the sprocket frame 60 utilizing the bolts 352, 354, 356. A shaft of the motor 38 is received in the internal aperture 357 and is coupled to the insert bushing 350 such that rotation of the motor shaft causes rotation of the sprocket frame 60.

Referring to FIG. 1, the chain 32 includes a plurality of chain links 575 that are coupled together. At least one of the chain links 575 is operably coupled to the car wash roller assembly 34, and at least one of the chain links 575 is operably coupled to the car wash roller assembly 36. In one exemplary embodiment, the plurality of chain links 575 are constructed of steel.

Figure 12:
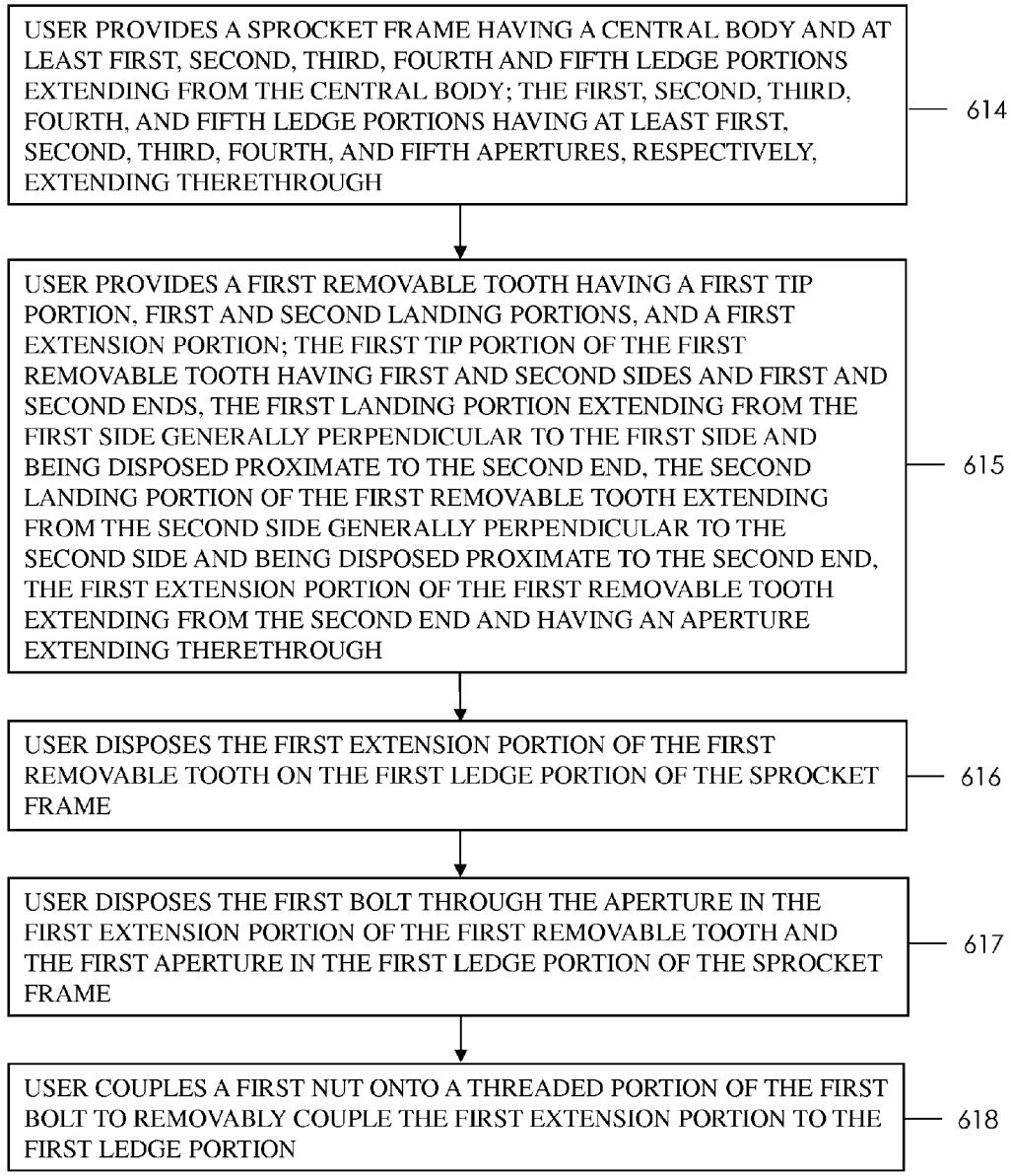
FIG. 12 is a flowchart of a method for installing the removable tooth of FIG. 7 on a sprocket frame in accordance with another exemplary environment.

Referring to FIGS. 1, 2 and 12, a flowchart of a method for installing a removable tooth on the sprocket frame 60 of the car wash conveyor system 10 in accordance with another exemplary embodiment will now be explained. For purposes of simplicity, only a single removable tooth 70 having a single aperture therethrough and a single bolt will be described in the below flowchart.

At step 614, the user provides the sprocket frame 60 having the central body 360 and at least ledge portions 370, 380, 390, 400, 410 extending from the central body 360. The ledge portions 370, 380, 390, 400, 410 have at least apertures 470, 480, 490, 500, 510, respectively, extending therethrough.

At step 615, the user provides the removable tooth 70 having the tip portion 550, landing portions 562, 564, and the extension portion 566. The tip portion 550 of the removable tooth 70 has first and second sides 552, 554 and first and second ends 556, 558. The landing portion 562 extends from the first side 552 generally perpendicular to the first side 552 and is disposed proximate to the second end 558. The landing portion 564 of the removable tooth 70 extends from the second side 554 generally perpendicular to the second side 554 and is disposed proximate to the second end 558. The extension portion 566 of the removable tooth 70 extends from the second end 558 and has an aperture 570 extending therethrough.

At step 616, the user disposes the extension portion 566 of the removable tooth 70 on the ledge portion 370 of the sprocket frame 60.

At step 617, the user disposes the bolt 770 through the aperture 570 in the extension portion 566 of the removable tooth 70 and the aperture 470 in the ledge portion 370 of the sprocket frame 60.

At step 618, the user couples the nut 270 onto a threaded portion of the bolt 770 to removably couple the extension portion 566 to the ledge portion 370.

Figure 13:
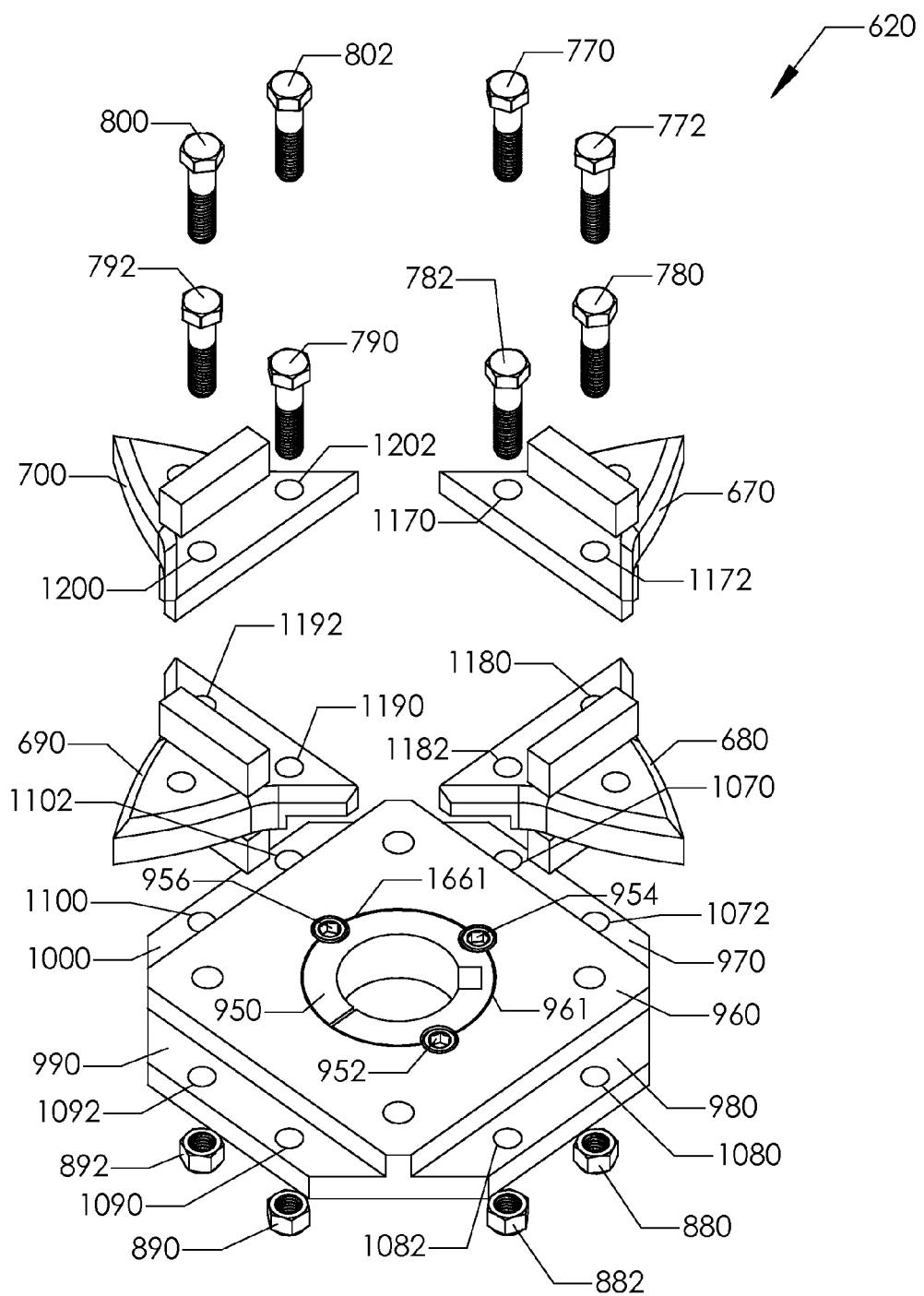
FIG. 13 is an exploded schematic of another sprocket assembly in accordance with another exemplary embodiment.
Figure 14:
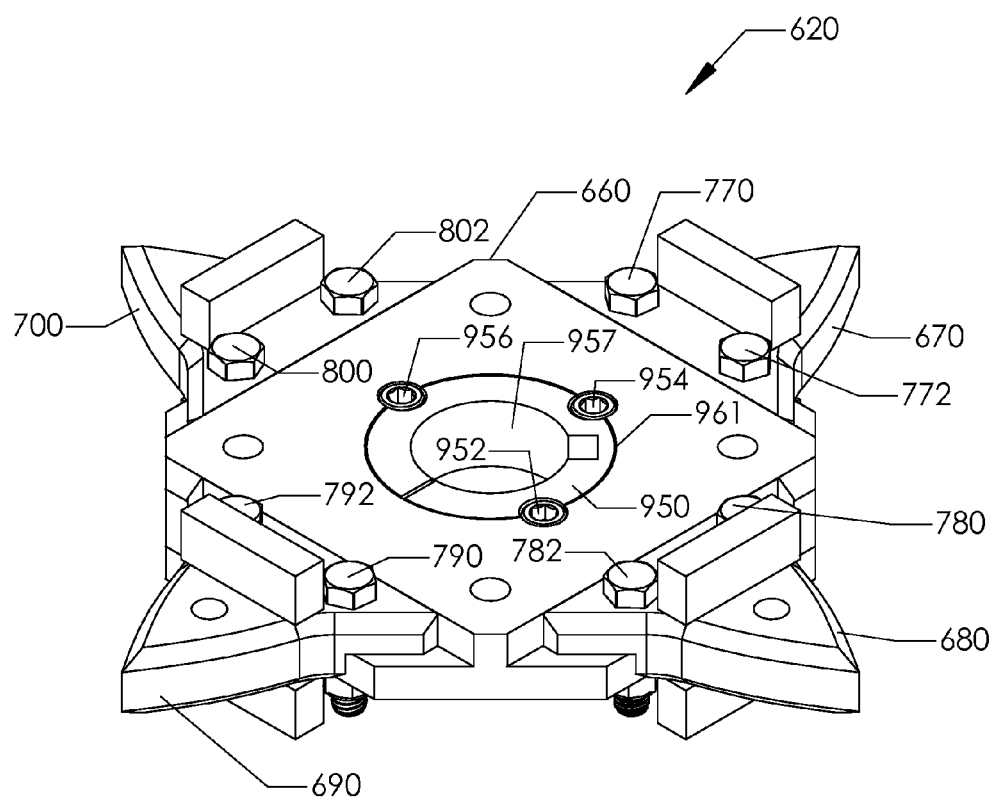
FIG. 14 is a schematic having an isometric view of the sprocket assembly of FIG. 13.
Figure 15:
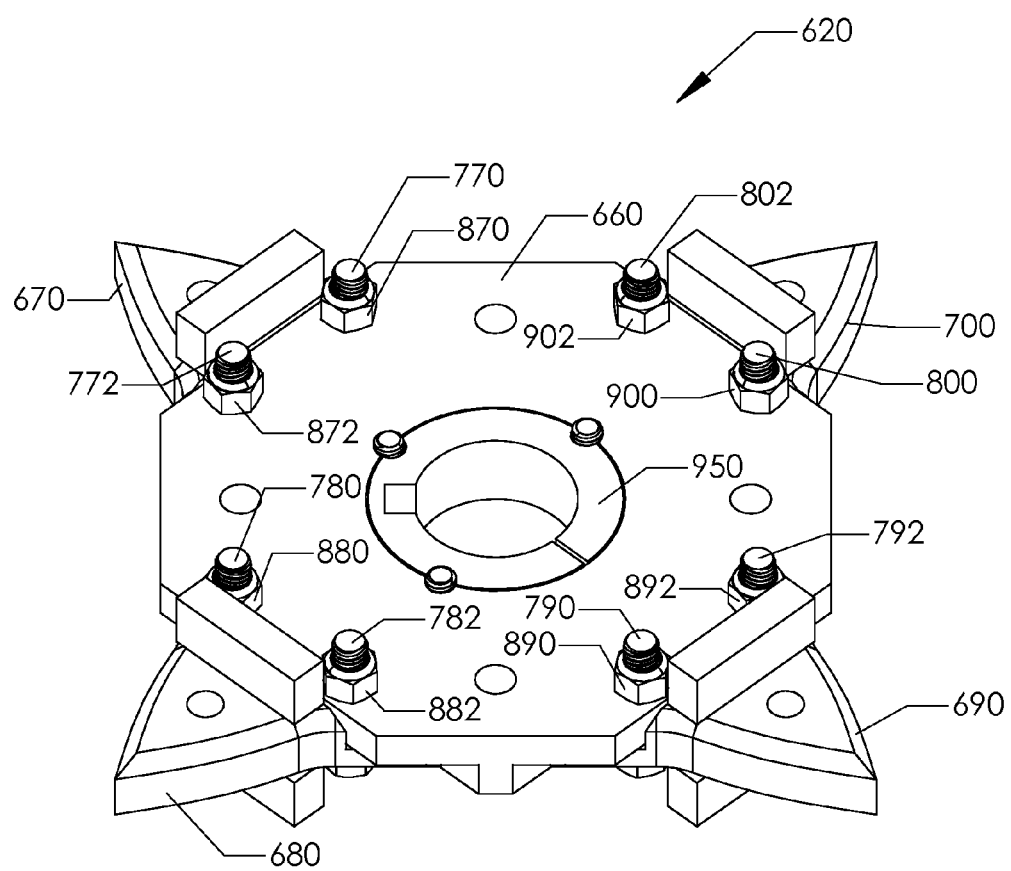
FIG. 15 is a schematic having another isometric view of the sprocket assembly of FIG. 13.

Referring to FIGS. 13-15, another sprocket assembly 620 that could be operably coupled to a chain to move the car wash roller assembly 34 and the car wash roller assembly 36 in accordance with another exemplary embodiment will be described. The sprocket assembly 620 includes a sprocket frame 660, a removable tooth 670, a removable tooth 680, a removable tooth 690, a removable tooth 700, bolts 770, 772, 780, 782, 790, 792, 800, 802, nuts 870, 872, 880, 882, 890, 892, 900, 902, an insert bushing 950, and bolts 952, 954, 956.

The sprocket frame 660 is configured to be coupled to a rotatable shaft of the motor 38 and is further configured to hold the removable teeth 670, 680, 690, 700 thereon. The sprocket frame 660 includes the central body 960, and ledge portions 970, 980, 990, 1000 that extend outwardly from an outer periphery of the central body 960. In one exemplary embodiment, the sprocket frame 660 is constructed of steel. Of course, in alternative embodiments, other materials known to those skilled in the art could be utilized to construct the sprocket frame 660.

The central body 960 includes a central aperture 961 extending therethrough that is configured to receive the insert bushing 950 therein. The thickness of the central body 960 is greater than a thickness of each of the ledge portions 970-1000. In one exemplary embodiment, the central body 960 is generally square-shaped. The ledge portions 970, 990 extend generally parallel to one another. The ledge portions 980, 1000 extend generally parallel to one another and perpendicular to the ledge portions 970, 990.

The ledge portion 970 is configured to hold an extension portion of the removable tooth 670 thereon and includes apertures 1070, 1072 extending therethrough.

The ledge portion 980 is configured to hold an extension portion of the removable tooth 680 thereon and includes apertures 1080, 1082 extending therethrough.

The ledge portion 990 is configured to hold an extension portion of the removable tooth 690 thereon and includes apertures 1090, 1092 extending therethrough.

The ledge portion 1000 is configured to hold an extension portion of the removable tooth 700 thereon and includes apertures 1100, 1102 extending therethrough.

The removable teeth 670, 680, 690, 700 are configured to be removably coupled to the ledge portions 970, 980, 990, 1000, respectively. The structure of the removable teeth 670, 680, 690, 700 are identical to the structure of removable tooth 70 described above.

Referring to FIGS. 13 and 15, the bolts 770, 772 are configured to extend through the apertures 1170, 1172, respectively, in the extension portion of the removable tooth 670, and through the apertures 1070, 1072, respectively, in the ledge portion 970. The bolts 770, 772 have corresponding threads that are threadably received in the nuts 870, 872, respectively, to removably couple the extension portion of the removable tooth 670 to the ledge portion 970.

The bolts 780, 782 are configured to extend through the apertures 1180, 1182, respectively, in the extension portion of the removable tooth 680, and through the apertures 1080, 1082, respectively, in the ledge portion 980. The bolts 780, 782 have corresponding threads that are threadably received in the nuts 880, 882, respectively, to removably couple the extension portion of the removable tooth 680 to the ledge portion 980.

The bolts 790, 792 are configured to extend through the apertures 1190, 1192, respectively, in the extension portion of the removable tooth 690, and through the apertures 1090, 1092, respectively, in the ledge portion 990. The bolts 790, 792 have corresponding threads that are threadably received in the nuts 890, 892, respectively, to removably couple the extension portion of the removable tooth 690 to the ledge portion 990.

The bolts 800, 802 are configured to extend through the apertures 1200, 1202, respectively, in the extension portion of the removable tooth 700, and through the apertures 1100, 1102, respectively, in the ledge portion 1000. The bolts 800, 802 have corresponding threads that are threadably received in the nuts 900, 902, respectively, to removably couple the extension portion of the removable tooth 700 to the ledge portion 1000.

The insert bushing 950 is configured to be received within the central aperture 961 of the sprocket frame 660. In one exemplary embodiment, the insert bushing 950 is substantially split-ring-shaped and has an internal aperture 957 extending therethrough. In one exemplary environment, the insert bushing 950 is constructed of steel. The insert bushing 950 is fixedly coupled to the central body 960 of the sprocket frame 660 utilizing the bolts 952, 954, 956. A shaft of the motor 38 is received in the internal aperture 957 and is coupled to the insert bushing 950 such that rotation of the motor shaft causes rotation of the sprocket frame 660.

Referring to FIGS. 16-19, a car wash conveyor system 1310 in accordance with another exemplary embodiment is provided. The car wash conveyor system 1310 includes a sprocket assembly 1320, a sprocket assembly 1330, a chain 1332, a car wash roller assembly 1334, a car wash roller assembly 1336, a motor 1338, and a motor controller 1340. An advantage of the sprocket assembly 1320 is that the sprocket assembly 1320 utilizes removable teeth that are configured to be readily replaced when the removable teeth become degraded.

The motor 1338 has a shaft (not shown) that rotates the sprocket assembly 1320 in response to receiving control signals from the motor controller 1340. When the sprocket assembly 1320 rotates in a first rotational direction, removable teeth in the sprocket assembly 1320 operably engage chain links in the chain 1332 to move the chain 1332 in a predetermined direction. In response to the movement of the chain 1332 in the predetermined direction, car wash roller assemblies 1334, 1336 that are coupled to the chain 1332 move along with the chain 1332. Further, the sprocket assembly 1330 operably engages chain links in the chain 1332 and rotates in the first rotational direction response to the movement of the chain 1332.

The sprocket assemblies 1320, 1330 have an identical structure to one another. Accordingly, only the structure of the sprocket assembly 1320 will be described in greater detail below. The sprocket assembly 1320 includes a sprocket frame 1360, a removable plastic tooth 1370, a removable plastic tooth 1380, a removable plastic tooth 1390, a removable plastic tooth 1400, bolts 1470, 1472, 1480, 1482, 1490, 1492, 1500, 1502, nuts 1570, 1572, 1580, 1582, 1590, 1592, 1600, 1602, an insert bushing 1650, and bolts 1652, 1654, 1656.

The sprocket frame 1360 is configured to be coupled to a rotatable shaft of the motor 1338 and is further configured to hold the removable plastic teeth 1370, 1380, 1390, 1400 thereon. The sprocket frame 1360 includes the central body 1660, and ledge portions 1670, 1680, 1690, 1700 that extend outwardly from an outer periphery of the central body 1660. In one exemplary embodiment, the sprocket frame 1660 is constructed of plastic. Of course, in alternative embodiments, other materials known to those skilled in the art could be utilized to construct the sprocket frame 1660.

The central body 1660 includes a central aperture 1661 extending therethrough that is configured to receive the insert bushing 1650 therein. The thickness of the central body 1660 is greater than a thickness of each of the ledge portions 1670-1700. In one exemplary embodiment, the central body 1660 is generally square-shaped. Also, the ledge portions 1670, 1690 extend generally parallel to one another. The ledge portions 1680, 1700 extend generally parallel to one another and perpendicular to the ledge portions 1670, 1690.

The ledge portion 1670 is configured to hold an extension portion of the removable tooth 1370 thereon and includes apertures 1770, 1772 extending therethrough.

The ledge portion 1680 is configured to hold an extension portion of the removable tooth 1380 thereon and includes apertures 1780, 1782 extending therethrough.

The ledge portion 1690 is configured to hold an extension portion of the removable tooth 1390 thereon and includes apertures 1790, 1792 extending therethrough.

The ledge portion 1700 is configured to hold an extension portion of the removable tooth 1400 thereon and includes apertures 1800, 1802 extending therethrough.

The removable plastic teeth 1370, 1380, 1390, 1400 are configured to be removably coupled to the ledge portions 1670, 1680, 1690, 1700, respectively. The structure of the removable plastic teeth 1370, 1380, 1390, 1400 are identical to one another. Accordingly, for purposes of simplicity only the structure of the removable tooth 1370 will be described in greater detail below.

The removable plastic tooth 1370 includes a tip portion 1850 and an extension portion 1866. The tip portion 1850 of the removable plastic tooth 1370 has first and second sides 1852, 1854 and first and second ends 1856, 1858. The extension portion 1866 of the removable plastic tooth 1370 extends from the second end 1858 and has the apertures 1870, 1872 extending therethrough.

The tip portion 1850 is configured to engage a chain link thereon. A longitudinal axis 1873 (shown in FIG. 19) extends from the first end 1856 to the second end 1858 of the tip portion 1850. The extension portion 1866 extends from the second end 1858 parallel to the longitudinal axis 1873. An axis 1874 (shown in FIG. 17) extends between the first and second sides 1852, 1854 of the tip portion 1850 of the removable plastic tooth 1370 generally perpendicular to the first and second sides 1852, 1854. A thickness of the tip portion 1850 is substantially equal to a combined thickness of both the extension portion 1866 and the ledge portion 1670 in a direction parallel to the axis 1874.

Figure 17:
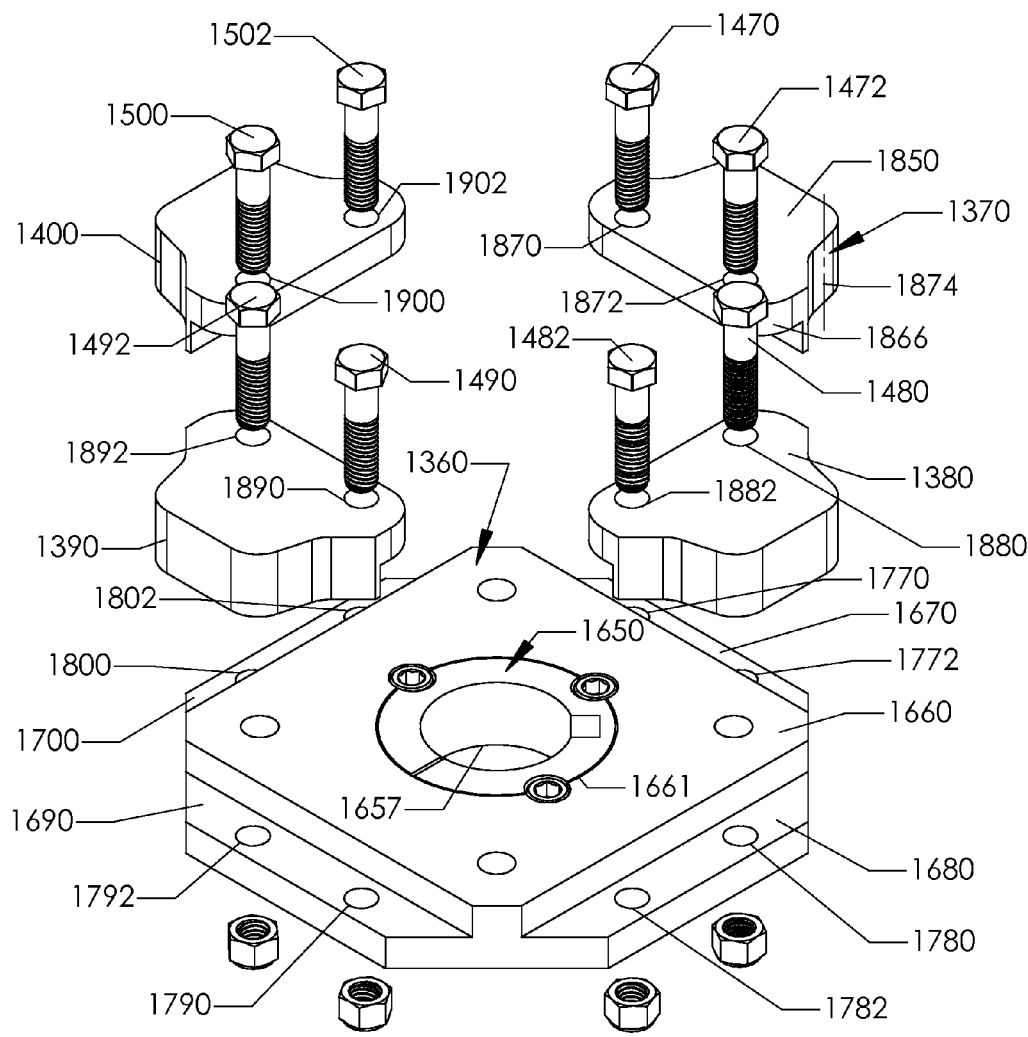
FIG. 17 is an exploded schematic of a sprocket assembly utilized in the car wash conveyor system of FIG. 16.
Figure 18:
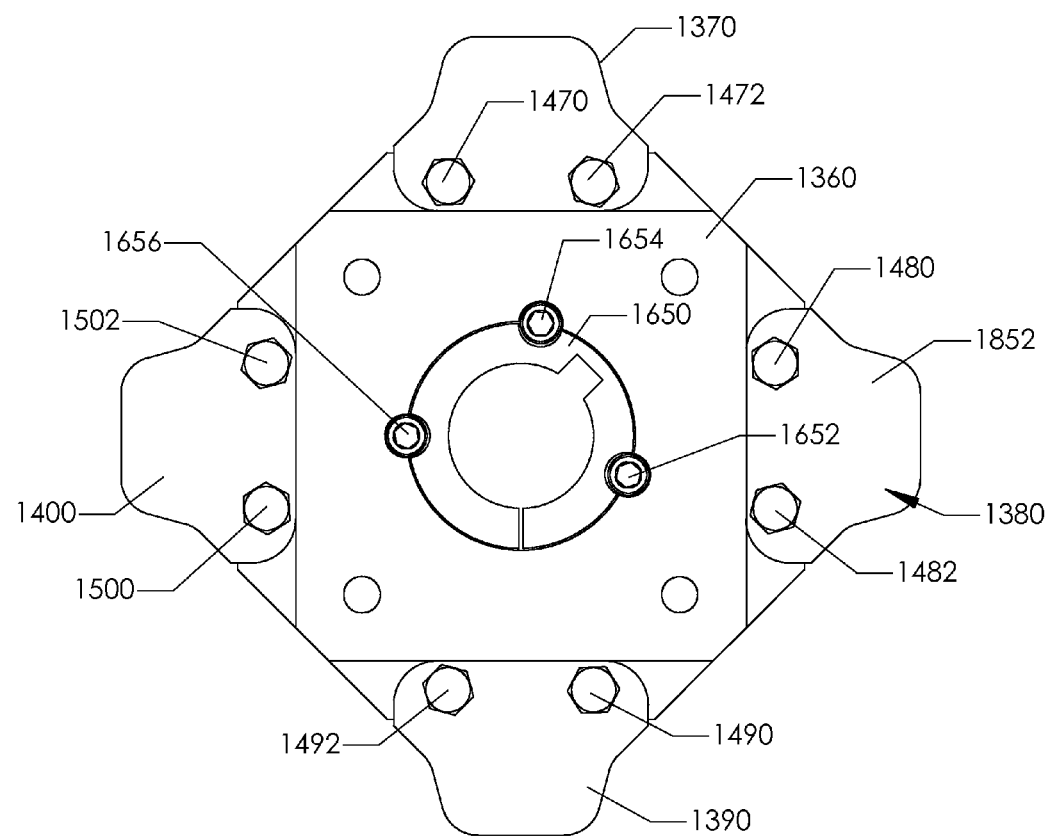
FIG. 18 is a schematic having a front view of the sprocket assembly of FIG. 17.
Figure 19:
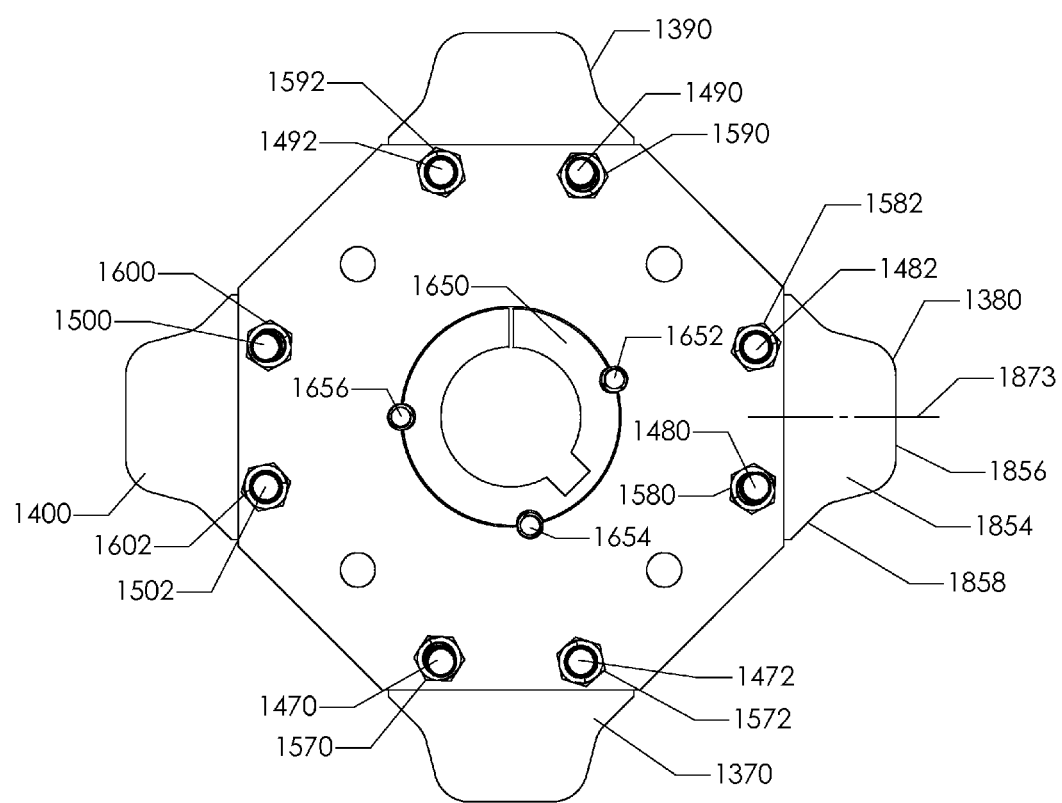
FIG. 19 is a schematic having a rear view of the sprocket assembly of FIG. 17.

Referring to FIGS. 17 and 19, the bolts 1470, 1472 are configured to extend through the apertures 1870, 1872, respectively, in the extension portion 1866 of the removable plastic tooth 1370, and through the apertures 1770, 1772, respectively, in the ledge portion 1670. The bolts 1470, 1472 have corresponding threads that are threadably received in the nuts 1570, 1572, respectively, to removably couple the extension portion 1866 to the ledge portion 1670.

The bolts 1480, 1482 are configured to extend through the apertures 1880, 1882, respectively, in the extension portion of the removable plastic tooth 1380, and through the apertures 1780, 1782, respectively, in the ledge portion 1680. The bolts 1480, 1482 have corresponding threads that are threadably received in the nuts 1580, 1582, respectively, to removably couple the extension portion of the removable plastic tooth 1380 to the ledge portion 1680.

The bolts 1490, 1492 are configured to extend through the apertures 1890, 1892, respectively, in the extension portion of the removable plastic tooth 1390, and through the apertures 1790, 1792, respectively, in the ledge portion 1690. The bolts 1490, 1492 have corresponding threads that are threadably received in the nuts 1590, 1592, respectively, to removably couple the extension portion of the removable plastic tooth 1390 to the ledge portion 1690.

The bolts 1500, 1502 are configured to extend through the apertures 1900, 1902, respectively, in the extension portion of the removable plastic tooth 1400, and through the apertures 1800, 1802, respectively, in the ledge portion 1700. The bolts 1500, 1502 have corresponding threads that are threadably received in the nuts 1600, 1602, respectively, to removably couple the extension portion of the removable plastic tooth 1400 to the ledge portion 1700.

The insert bushing 1650 is configured to be received within the central aperture 1661 of the sprocket frame 1360. In one exemplary embodiment, the insert bushing 1650 is substantially split-ring-shaped and has an internal aperture 1657 extending therethrough. In one exemplary environment, the insert bushing 1650 is constructed of steel. The insert bushing 1650 is fixedly coupled to the central body 1660 of the sprocket frame 1360 utilizing the bolts 1652, 1654, 1656. A shaft of the motor 1338 is received in the internal aperture 1657 and is coupled to the insert bushing 1650 such that rotation of the motor shaft causes rotation of the sprocket frame 1360.

Figure 16:
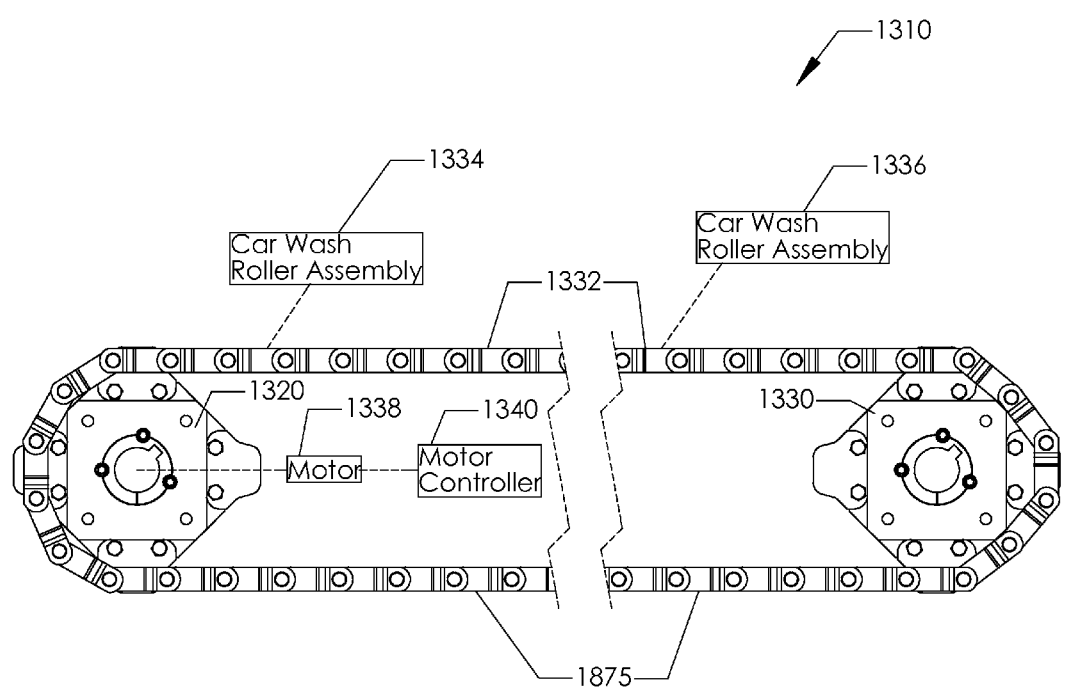
FIG. 16 is a schematic of another car wash conveyor system in accordance with another exemplary embodiment.

Referring to FIG. 16, the chain 1332 includes a plurality of chain links 1875 that are coupled together. At least one of the chain links 1875 is operably coupled to the car wash roller assembly 1334, and at least one of the chain links 575 is operably coupled to the car wash roller assembly 1336. In one exemplary embodiment, the plurality of chain links 1875 are constructed of plastic.

Figure 20:
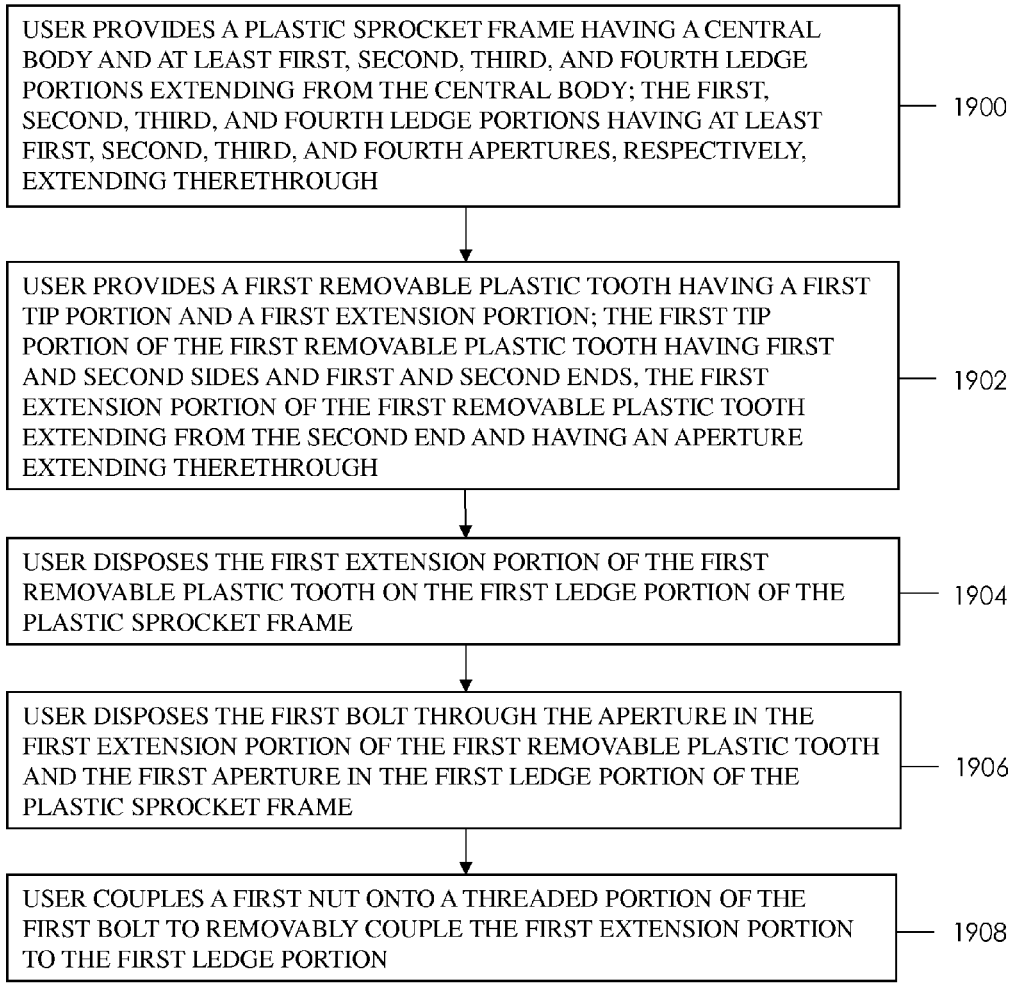
FIG. 20 is a flowchart of a method for installing a removable tooth on a sprocket frame in accordance with another exemplary embodiment.

Referring to FIG. 20, a flowchart of a method for installing a removable plastic tooth on the sprocket frame 1360 of the car wash conveyor system 1310 in accordance with another exemplary embodiment will now be explained. For purposes of simplicity, only a single removable plastic tooth 1370 having a single aperture therethrough and a single bolt will be described in the below flowchart.

At step 1900, the user provides the plastic sprocket frame 1360 having the central body 1660 and at least ledge portions 1670, 1680, 1690, 1700 extending from the central body 1660. The ledge portions 1670, 1680, 1690, 1700 have at least apertures 1770, 1780, 1790, 1800, respectively, extending therethrough.

At step 1902, the user provides the removable plastic tooth 1370 having the tip portion 1850 and the extension portion 1866. The tip portion 1850 of the removable plastic tooth 1370 has first and second sides 1852, 1854 and first and second ends 1856, 1858. The extension portion 1866 of the removable plastic tooth 1370 extends from the second end 1858 and has the aperture 1870 extending therethrough.

At step 1904, the user disposes the extension portion 1866 of the removable plastic tooth 1370 on the ledge portion 1670 of the plastic sprocket frame 1360.

At step 1906, the user disposes the bolt 1470 through the aperture 1870 in the extension portion 1866 of the removable plastic tooth 1370 and the aperture 1770 in the ledge portion 1670 of the plastic sprocket frame 1370.

At step 1908, user couples the nut 1570 onto a threaded portion of the bolt 1470 to removably couple the extension portion 1866 to the ledge portion 1670.

The sprocket assemblies and the method described herein provide a substantial advantage over sprocket assemblies and methods. In particular, the sprocket assemblies and method utilize removable teeth with extension portions coupled to ledge portions of the sprocket assemblies to allow a user to readily replace the removable teeth when the removable teeth become degraded.

While the claimed invention has been described in detail in connection with only a limited number of embodiments, it should be readily understood that the invention is not limited to such disclosed embodiments. Rather, the claimed invention can be modified to incorporate any number of variations, alterations, substitutions or equivalent arrangements not heretofore described, but which are commensurate with the spirit and scope of the invention. Additionally, while various embodiments of the claimed invention have been described, it is to be understood that aspects of the invention may include only some of the described embodiments. Accordingly, the claimed invention is not to be seen as limited by the foregoing description.

What is claimed is:

1. A sprocket assembly, comprising:
a plastic octagonal-shaped sprocket frame having a central body and first, second, third, and fourth trapezoidal-shaped ledge portions extending from the central body;
the central body having first, second, third, fourth, fifth, sixth, seventh, and eighth ends, and a top surface; the first end and the second end of the central body extending substantially parallel to one another, the third end and the fourth end of the central body extending substantially parallel to one another and substantially perpendicular to the first end and the second end of the central body; the first, second, third, fourth, fifth, sixth, seventh, and eighth ends defining first, second, third, fourth, fifth, sixth, seventh, and eighth flat end surfaces, respectively, that extend downwardly from the top surface of the central body;
the fifth end extending between and from the first end and the fourth end of the central body, the sixth end extending between and from the second end and the fourth end of the central body, the seventh end extending between and from the second end and the third end of the central body, and the eighth end extending between and from the first end and the third end of the central body; the fifth end and the seventh end extending substantially parallel to one another, the sixth end and the eighth end extending substantially parallel to one another;

the first and second trapezoidal-shaped ledge portions being coupled to and extending from the first end and the second end, respectively, of the central body and being spaced apart from one another and extending substantially parallel to one another; the first and second trapezoidal-shaped ledge portions having first and second trapezoidal-shape top surfaces respectively, that are disposed a predetermined distance below the top surface of the central body;

the third and fourth trapezoidal-shaped ledge portions being coupled to and extending from the third end and the fourth end, respectively, of the central body and being spaced apart from one another and extending substantially parallel to one another and substantially perpendicular to the first and second trapezoidal-shaped ledge portions; the third and fourth trapezoidal-shaped ledge portions having third and fourth trapezoidal-shaped top surfaces, respectively, that are disposed the predetermined distance below the top surface of the central body;

a first removable plastic tooth having a first tip portion and a first extension portion; the first tip portion of the first removable plastic tooth having first and second ends, the first extension portion of the first removable plastic tooth extending from the second end of the first removable plastic tooth, the first extension portion of the first removable plastic tooth being removably coupled to the first trapezoidal-shaped ledge portion of the plastic frame member utilizing a first bolt; the first extension portion of the first removable plastic tooth being disposed on the first trapezoidal-shaped top surface of the first trapezoidal-shaped ledge portion and abutting against the first flat end surfaces of the central body;

a second removable plastic tooth having a first tip portion and a first extension portion; the first tip portion of the second removable plastic tooth having first and second ends, the first extension portion of the second removable plastic tooth extending from the second end of the second removable plastic tooth, the first extension portion of the second removable plastic tooth being removably coupled to the second trapezoidal-shaped ledge portion of the plastic frame member utilizing a second bolt; the first extension portion of the second removable plastic tooth being disposed on the second trapezoidal-shaped top surface of the second trapezoidal-shaped ledge portion and abutting against the second flat end surface of the central body;

an end surface of the first tip portion of the first removable plastic tooth extending substantially parallel to an end surface of a first tip portion of the second removable plastic tooth;

a third removable plastic tooth having a first tip portion and a first extension portion; the first tip portion of the third removable plastic tooth having first and second ends, the first extension portion of the third removable plastic tooth extending from the second end of the third removable plastic tooth, the first extension portion of the third removable plastic tooth being removably coupled to the third trapezoidal-shaped ledge portion of the plastic frame member utilizing a third bolt;

a fourth removable plastic tooth having a first tip portion and a first extension portion; the first tip portion of the fourth removable plastic tooth having first and second ends, the first extension portion of the fourth removable plastic tooth extending from the second end of the fourth removable plastic tooth, the first extension portion of the fourth removable plastic tooth being removably coupled to the third trapezoidal-shaped ledge portion of the plastic frame member utilizing a fourth bolt; and an end surface of the first tip portion of the third removable plastic tooth extending substantially parallel to an end surface of a first tip portion of the fourth removable plastic tooth and substantially perpendicular to the end surface of the first tip portion of the first removable plastic tooth.

2. The sprocket assembly of claim 1, wherein the first tip portion of the first removable plastic tooth is configured to operably engage a chain link.

3. The sprocket assembly of claim 1, wherein a longitudinal axis extends from the first end to the second end of the first tip portion, the first extension portion extending from the second end of the first tip portion in a direction parallel to the longitudinal axis.

4. The sprocket assembly of claim 1, wherein a first axis extends between first and second sides of the first tip portion of the first removable plastic tooth generally perpendicular to the first and second sides, a thickness of the first tip portion is substantially equal to a combined thickness of both the first extension portion and the first ledge portion in a direction parallel to the first axis.

5. The sprocket assembly of claim 1, wherein the central body of the plastic octagonal-shaped sprocket frame has a central aperture extending therethrough that is configured to receive an insert bushing therein, the insert bushing being removably coupled to the central body.

6. The sprocket assembly of claim 5, wherein the insert bushing is constructed of steel.

7. The sprocket assembly of claim 1, wherein the first trapezoidal-shaped ledge portion has first, second, and third outer ends; the third outer end extending between the first and second outer ends, the first and second outer ends being co-planar with the fifth and eight ends, respectively, of the central body.

8. A method for installing a removable plastic tooth on a plastic octagonal-shaped sprocket frame, the method comprising:

providing the plastic octagonal-shaped sprocket frame having a central body and first, second, third, and fourth trapezoidal-shaped ledge portions extending from the central body; the central body having first, second, third, fourth, fifth, sixth, seventh, and eighth ends, and a top surface; the first end and the second end of the central body extending substantially parallel to one another, the third end and the fourth end of the central body extending substantially parallel to one another and substantially perpendicular to the first end and the second end of the central body; the first, second, third, fourth, fifth, sixth, seventh, and eighth ends defining first, second, third, fourth, fifth, sixth, seventh, and eighth flat end surfaces, respectively, that extend downwardly from the top surface of the central body; the fifth end extending between and from the first end and the fourth end of the central body, the sixth end extending between and from the second end and the fourth end of the central body, the seventh end extending between and from the second end and the third end of the central body, and the eighth end extending between and from the first end and the third end of the central body; the fifth end and the seventh end extending substantially parallel to one another, the sixth end and the eighth end extending substantially parallel to one another; the first and second trapezoidal-shaped ledge portions being coupled to and extending from the first end and the second end, respectively, of the central body and being spaced apart from one another and extending substantially parallel to one another; the first and second trapezoidal-shaped ledge portions having first and second trapezoidal-shape top surfaces, respectively, that are disposed a predetermined distance below the top surface of the central body; the third and fourth trapezoidal-shaped ledge portions being coupled to and extending from the third end and the fourth end, respectively, of the central body and being spaced apart from one another and extending substantially parallel to one another and substantially perpendicular to the first and second trapezoidal-shaped ledge portions;

providing a first removable plastic tooth having a first tip portion and a first extension portion; the first tip portion of the first removable plastic tooth having first and second ends, the first extension portion of the first removable plastic tooth extending from the second end of the first tip portion of the first removable plastic tooth and having an aperture extending therethrough;

disposing the first extension portion of the first removable plastic tooth on the first trapezoidal-shaped top surface of the first trapezoidal-shaped ledge portion of the plastic octagonal-shaped sprocket frame, and abutting against the first flat end surface of the central body;

disposing a first bolt through the aperture in the first extension portion of the first removable plastic tooth and a first aperture in the first trapezoidal-shaped ledge portion of the plastic octagonal-shaped sprocket frame; and coupling a first nut onto a threaded portion of the first bolt to removably couple the first extension portion of the first removable plastic tooth to the first trapezoidal-shaped ledge portion;

providing a second removable plastic tooth having a first tip portion and a first extension portion; the first tip portion of the second removable plastic tooth having first and second ends, the first extension portion of the second removable plastic tooth extending from the second end of the first tip portion of the second removable plastic tooth and having an aperture extending therethrough;

disposing the first extension portion of the second removable plastic tooth on the second trapezoidal-shaped top surface of the second trapezoidal-shaped ledge portion of the plastic octagonal-shaped sprocket frame and abutting against the second flat end surface of the central body such that an end surface of the first tip portion of the second removable plastic tooth extending substantially parallel to an end surface of the first tip portion of the first removable plastic tooth;

disposing a second bolt through the aperture in the first extension portion of the second removable plastic tooth and a second aperture in the second trapezoidal-shaped ledge portion of the plastic octagonal-shaped sprocket frame; and coupling a second nut onto a threaded portion of the second bolt to removably couple the first extension portion of the second removable plastic tooth to the second trapezoidal-shaped ledge portion.

9. The method of claim 8, wherein the first trapezoidal-shaped ledge portion has first, second, and third outer ends; the third outer end extending between the first and second outer ends, the first and second outer ends being co-planar with the fifth and eight ends, respectively, of the central body.

10. A sprocket assembly, comprising:

a plastic octagonal-shaped sprocket frame having a central body and first, second, third, and fourth trapezoidal-shaped ledge portions extending from the central body;

the central body having first, second, third, fourth, fifth, sixth, seventh, and eighth ends, and a top surface; the first end and the second end of the central body extending substantially parallel to one another, the third end and the fourth end of the central body extending substantially parallel to one another and substantially perpendicular to the first end and the second end of the central body; the first, second, third, fourth, fifth, sixth, seventh, and eighth ends defining first, second, third, fourth, fifth, sixth, seventh, and eighth flat end surfaces, respectively, that extend downwardly from the top surface of the central body;

the fifth end extending between and from the first end and the fourth end of the central body, the sixth end extending between and from the second end and the fourth end of the central body, the seventh end extending between and from the second end and the third end of the central body, and the eighth end extending between and from the first end and the third end of the central body; the fifth end and the seventh end extending substantially parallel to one another, the sixth end and the eighth end extending substantially parallel to one another;

the first and second trapezoidal-shaped ledge portions being coupled to and extending from the first end and the second end, respectively, of the central body and being spaced apart from one another and extending substantially parallel to one another; the first and second trapezoidal-shaped ledge portions having first and second trapezoidal-shape top surfaces, respectively, that are disposed a predetermined distance below the top surface of the central body;

the third and fourth trapezoidal-shaped ledge portions being coupled to and extending from the third end and the fourth end, respectively, of the central body and being spaced apart from one another and extending substantially parallel to one another and substantially perpendicular to the first and second trapezoidal-shaped ledge portions; the third and fourth trapezoidal-shaped ledge portions having third and fourth trapezoidal-shaped top surfaces, respectively, that are disposed the predetermined distance below the top surface of the central body;

a first removable plastic tooth having a first tip portion and a first extension portion; the first tip portion of the first removable plastic tooth having first and second ends, the first extension portion of the first removable plastic tooth extending from the second end of the first removable plastic tooth, the first extension portion of the first removable plastic tooth being removably coupled to the first trapezoidal-shaped ledge portion of the plastic frame member utilizing a first bolt; the first extension portion of the first removable plastic tooth being disposed on the first trapezoidal-shaped top surface of the first trapezoidal-shaped ledge portion and abutting against the first flat end surfaces of the central body;

a second removable plastic tooth having a first tip portion and a first extension portion; the first tip portion of the second removable plastic tooth having first and second ends, the first extension portion of the second removable plastic tooth extending from the second end of the second removable plastic tooth, the first extension portion of the second removable plastic tooth being removably coupled to the second trapezoidal-shaped ledge portion of the plastic frame member utilizing a second bolt; the first extension portion of the second removable plastic tooth being disposed on the second trapezoidal-shaped top surface of the second trapezoidal-shaped ledge portion and abutting against the second flat end surface of the central body;

a third removable plastic tooth having a first tip portion and a first extension portion; the first tip portion of the third removable plastic tooth having first and second ends, the first extension portion of the third removable plastic tooth extending from the second end of the third removable plastic tooth, the first extension portion of the third removable plastic tooth being removably coupled to the third trapezoidal-shaped ledge portion of the plastic frame member utilizing a third bolt; and a fourth removable plastic tooth having a first tip portion and a first extension portion; the first tip portion of the fourth removable plastic tooth having first and second ends, the first extension portion of the fourth removable plastic tooth extending from the second end of the fourth removable plastic tooth, the first extension portion of the fourth removable plastic tooth being removably coupled to the third trapezoidal-shaped ledge portion of the plastic frame member utilizing a fourth bolt.

\* \* \* \* \*